US009618080B2

(12) United States Patent
Bürgel

(10) Patent No.: US 9,618,080 B2
(45) Date of Patent: Apr. 11, 2017

(54) AUTOMATIC DISPENSER FOR BALANCING WEIGHTS

(71) Applicant: Wegmann Automotive GmbH & Co. KG, Veitshöchheim (DE)

(72) Inventor: Hans-Ulrich Bürgel, Roden (DE)

(73) Assignee: WEGMANN AUTOMOTIVE GMBH & CO. KG, Veitshöchheim (DE)

(*) Notice: Subject to any disclaimer, the term of this patent is extended or adjusted under 35 U.S.C. 154(b) by 0 days.

(21) Appl. No.: 14/885,281

(22) Filed: Oct. 16, 2015

(65) Prior Publication Data
US 2016/0047437 A1  Feb. 18, 2016

Related U.S. Application Data

(63) Continuation of application No. PCT/EP2014/056988, filed on Apr. 8, 2014.

(30) Foreign Application Priority Data

Apr. 19, 2013  (EP) .................................. 13164570

(51) Int. Cl.
B65D 83/00 (2006.01)
F16F 15/32 (2006.01)
G01M 1/02 (2006.01)

(52) U.S. Cl.
CPC ............ *F16F 15/324* (2013.01); *B65D 83/00* (2013.01); *G01M 1/02* (2013.01)

(58) Field of Classification Search
CPC ...................................................... G07F 9/105
See application file for complete search history.

(56) References Cited

U.S. PATENT DOCUMENTS 4,108,333 A * 8/1978 Falk .................... G07F 9/105
198/817
4,903,398 A  2/1990 Sakamoto et al.
(Continued)

FOREIGN PATENT DOCUMENTS

DE  2745858 A1  4/1979
DE  8313868 U1  9/2008
(Continued)

OTHER PUBLICATIONS

International Search Report and Written Opinion as mailed on Jun. 27, 2014 for International Patent Application No. PCT/EP2014/056988.

Primary Examiner — Timothy Waggoner
Assistant Examiner — Ayodeji Ojofeitimi
(74) Attorney, Agent, or Firm — Yakov Sidorin; Quarles & Brady LLP

(57) ABSTRACT

A dispenser for balancing weights for vehicles comprises a plurality of dispenser modules. The dispenser modules have a cartridge with at least two compartments for storing balancing weights. Each compartment has at least one retrieval opening. A cartridge actuator moves the cartridge linearly along a first axis, such that a retrieval feed opening is positioned above a slider feed opening in the dispenser module. A slider, which is operated by a slider actuator along a second axis, parallel to the first axis, has a balancing weight compartment, which can be moved under the slider feed opening, such that a balancing weight may drop from the cartridge into the compartment. The compartment is then moved to a picking tray in which the balancing weight is delivered to a handling device for placing the balancing weight to a wheel.

9 Claims, 3 Drawing Sheets

(56) References Cited

U.S. PATENT DOCUMENTS 7,819,281 B2 * 10/2010 Guindulain Busto .. G07F 11/58
                                                     221/120
2004/0238557 A1 * 12/2004 Chirnomas .............. A23G 9/28
                                                     221/124

FOREIGN PATENT DOCUMENTS

| DE | 102011054579 A1 | 4/2013 |
|----|-----------------|--------|
| FR | 2729376 A1 | 7/1996 |
| GB | 1408674 A | 10/1975 |
| WO | 2013034399 A1 | 3/2013 |

* cited by examiner

AUTOMATIC DISPENSER FOR BALANCING WEIGHTS

CROSS-REFERENCE TO RELATED APPLICATIONS

This application is a continuation of pending International Application No. PCT/EP2014/056988 filed on 8 Apr. 2014, which designates the United States and claims priority from European Application No. 13164570.7 filed on Apr. 19, 2013.

BACKGROUND

1. Field of the Invention

The invention relates to methods and devices for dispensing weights used in vehicle ballasting applications, and, in particular for dispensing weights used in balancing of wheels of an automobile or other vehicle.

2. Description of Relevant Art

In automotive wheel balancing, individual wheel balancing weights are applied to a rim at specific positions. Basically, two types of balancing weight are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1. Both kinds of balancing weights are available in a plurality of sizes, resulting in different weights.

Balancing weights may be attached to a wheel by a fitting apparatus as disclosed in the U.S. Pat. No. 4,903,398. A weight fitting device picks up a balancing weight from a picking position and fits the balancing weight to the wheel. A balancing feeding device delivers balancing weights by means of vibrating buckets into racks holding the balancing weights in their picking position. This feeding device requires a significant amount of space.

The international patent application PCT/EP 2013/055592 discloses balancing weights for vehicle wheels, which are held together by a connecting cord. This document is incorporated herein by reference.

SUMMARY OF THE INVENTION

The embodiments provide an apparatus and a method for automatic dispensing of vehicle balancing weights with reduced space requirement, increased feeding speed and precise location of the delivered balancing weights at a picking position. Furthermore, it is desired to have a high flexibility in delivering different types of balancing weights and easy adaptation to new kinds of balancing weights.

In a first embodiment, a dispenser has at least one dispenser module, preferably a plurality of dispenser modules. Preferably, each dispenser module is operably adapted to a specific kind of balancing weight. It may be adapted to a specific mass, a specific size, or to a clip-on balancing weight or a self-adhesive balancing weight.

Each dispenser module has at least a cartridge for holding a plurality of balancing weights, an actuator for moving the cartridge, and a slider for moving a balancing weight from the cartridge to the picking tray, where the balancing weight may be picked up by a handling device. Such a handling device will then attach the picked balancing weight to a wheel.

Each cartridge has at least one compartment, preferably two compartments. Each compartment has a refill opening at its top, and a retrieval opening at its bottom. Within the cartridge, there is preferably a plurality of guides for guiding and holding balancing weights within each compartment. An actuator is provided outside of the cartridge to linearly move or displace the cartridge along a first axis. The actuator preferably is an electric, pneumatic, or hydraulic actuator. The actuator may be controlled by an actuator controller, which may be an electronic, pneumatic, or hydraulic control unit. The cartridge is moved by the actuator in such a way that one of the retrieval openings of one of the compartments is above a slider feed opening in the dispenser module. Below the slider feed opening, there is a slider, which has a balancing weight compartment to precisely hold a balancing weight. Each slider is connected to a slider actuator, which can linearly move the slider along an axis preferably parallel to the first axis of the cartridge. For dispensing a balancing weight, the slider is moved in a position below the slider feed opening. This causes the bottommost balancing weight of a stack of balancing weights held within the compartment above the slider feed opening to drop into the balancing weight compartment. The balancing weight compartment has an outer contour, which fits to the balancing weight to hold and guide the balancing weight, and to allow smooth sliding of the balancing weight through the openings. There may be a fitting tolerance of less than 1 mm, preferably less than 0.5 mm, most preferably less than 0.1 mm. Furthermore, the balancing weight compartment has such a height that exactly one balancing weight fits into this compartment. This allows to move the slider back again and to move the balancing weight to the picking tray, where the balancing weight is exposed and may be picked up by a balancing weight handling device. It is further preferred to have a sensor, which may detect at least one of (i) the presence of a balancing weight, and (ii) the access of a balancing weight handling device to the picking tray, to determine whether a balancing weight is in the picking tray or whether it has been removed by a balancing weight handling device. After the detector has detected the absence of a balancing weight in the picking tray, and therefore the absence of the balancing weight of the balancing weight compartment, the slider actuator is activated to move the balancing weight compartment back under the slider feed opening to receive the next balancing weight from the cartridge. This feeding process is a simple linear movement done by the slider and moving the balancing weight from the cartridge to the picking tray. This movement can be done in a very short time and with a comparatively high speed, providing a high delivery rate of balancing weights.

Although it is preferred to have two compartments within each cartridge, there may be a different number of compartments in a cartridge. For example, it may be desirable to have a higher number of compartments within a cartridge, specifically, if the balancing weights are comparatively small and if a high number of balancing weights is required.

It is further preferred to have a control unit like the actuator controller, which may control the number of balancing weights available within a cartridge or within the individual compartments. This number may be controlled by counting the number of movements of the slider and/or by at least one detector for detecting the number of balancing weights within a cartridge or compartment. Such a detector either may count the number of balancing weights or may indicate the stack height within a compartment. It may be a mechanical switch or sensor, or an optical or magnetic sensor. The sensor in the picking tray may be a similar kind of sensor. The actuator controller may also indicate if a refill of the cartridge or a compartment is required. For refilling, it may bring the cartridge into a specific refilling position. In addition, refill may be done during regular operation. It may be desirable to have a specific refill mode, in which the operation of the cartridge actuator is ceased to prevent a damage and/or injury of the person refilling the balancing weights. Anyway, it should be possible to deliver balancing weights by actuating the slider during refill.

Another embodiment relates to a method for providing or delivering a balancing weight to a picking tray. The method comprises the steps of storing balancing weights within a cartridge; moving the cartridge along a first axis so that a retrieval opening of a compartment of the cartridge is above a slider feed opening of the dispenser module; dropping balancing weights into a balancing weight compartment of a slider, through the slider feed opening; pushing the slider together with the balancing weights to a picking tray.

Due to the modular concept, the dispenser provides a high flexibility. There may be any number of dispenser modules combined to a dispenser. In simple cases, it may be sufficient to deliver only one type of balancing weight. Here, a single dispenser module would be sufficient. To increase the capacity, a plurality of dispenser modules delivering the same kind of balancing weights may be used in a dispenser. First, the storage capacity can be increased, as there is provided a higher number of cartridges for storing balancing weights. Furthermore, a higher number of dispenser modules can increase the delivery rate of balancing weights to the picking tray. For example, if there are three identical dispenser modules, there is three-times the storage capacity for balancing weights available. Furthermore, there is a triple delivery rate from the cartridges to the picking tray. When a balancing weight handling device picks up the first balancing weight, this will be reloaded by the dispenser. During the reloading time, the handling device may still pick the second and third balancing weights of the other dispenser modules. After this has been done, the first dispenser module may have finished reloading.

It is not necessary to have a communication like a data link or other signaling between the dispenser and a handling device, as there is always a full assortment of balancing weights presented at the picking tray. The handling device only has to know which weight is presented at which location. This simplifies system design significantly and allows an easy interchange of components.

Due to the small size of the individual dispenser modules, a dispenser generally can be built significantly smaller than dispensers known from the prior art. Furthermore, multiple dispenser modules may be used for the same type of balancing weights, as mentioned above, without significantly increasing the size of the dispenser. As the dispenser is a comparatively handy and compact unit, it can easily be exchanged in one piece. This may be of benefit for maintenance or for changing to a different kind of balancing weights required for different kind of wheels. Due to the high modularity, even single dispenser modules may individually be exchanged, which may be necessary for maintenance or for adapting to different kinds of balancing weights. Another advantage is the precise positioning or location of the delivered balancing weight at a specific picking position on the picking tray. The balancing weight is held within a slider precisely, and therefore may be positioned with a precision up to 0.1 mm. This allows simplified handling by the balancing weight handling device, and a significantly higher speed in picking up balancing weights. The cartridges allow for easier and quicker loading with balancing weights due to their refill openings at the top of the cartridges. Preferably, a stack of bundled balancing weights is inserted into a cartridge, which can be done within a few seconds. It is obvious that the embodiments disclosed herein are applicable to a broad variety of balancing weights like balancing weights, which may be held by a clamp, or self-adhesive balancing weights.

BRIEF DESCRIPTION OF THE DRAWINGS

In the following, the invention will be described by way of example, without limitation of the general inventive concept, on examples of embodiment and with reference to the drawings.

Figure 1:
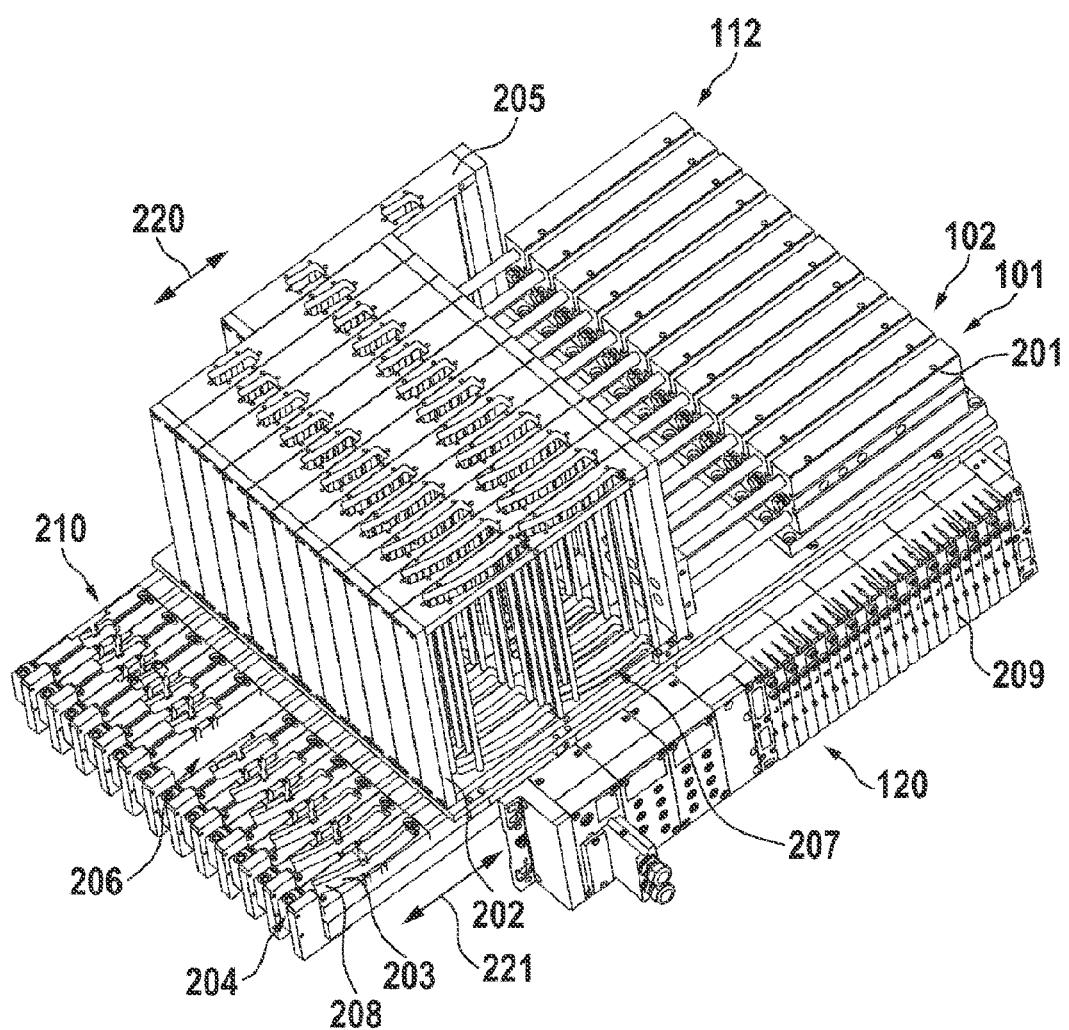
FIG. 1 shows an apparatus for dispensing balancing weights in a perspective view.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a perspective view of a first embodiment is shown. A dispenser has twelve dispenser modules 101-112 arranged in parallel. A dispenser may have any different number of modules starting from one to a number as high as desired. Each dispenser has a cartridge 202, 300 which may be removable from the dispenser, and which is actuated by a cartridge actuator 201, and can be moved along a first axis 220. The cartridges are shown in detail in the following figure. For dispensing balancing weights, a slider 203 is provided. It has a balancing weight compartment 208, and can be moved by means of a slider actuator 209 along a first axis 221. The balancing weight compartment is loaded with a balancing weight by moving it under a slider feed opening, thus allowing a balancing weight to drop from the cartridge into the balancing weight compartment. After that, the slider is moved back to its starting position to present the balancing weight to the picking tray of the dispenser module, from where the balancing weight may be picked up by a balancing weight handling device. At the picking tray, at least one sensor, preferably one sensor for each dispenser module is provided to determine, whether a balancing weight is in the balancing weight compartment. If the compartment is empty, a refill is required, by moving the balancing weight compartment under the slider feed opening 207. The actuators are controlled by actuator controller 120. In this figure, a slider 206 is shown in its loading position, whereas the balancing weight compartment is below its slider feed opening. The leftmost cartridge 205 is shown in a displaced position, whereas its first compartment is above the slider feed opening. The other cartridges are in positions holding their second compartments above their slider feed openings.

Figure 2:
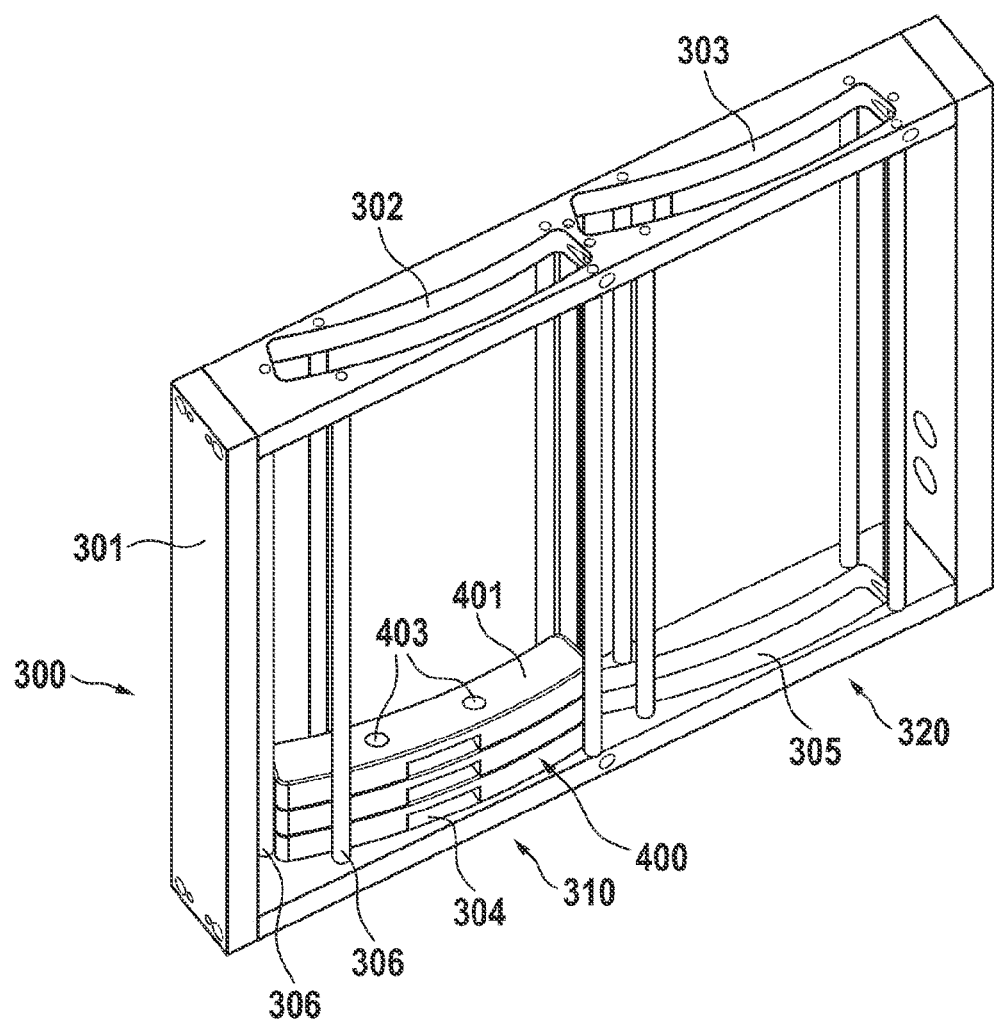
FIG. 2 shows a cartridge in a perspective view.

In FIG. 2, a cartridge 300 is disclosed in detail. This cartridge has a frame 301 holding and stabilizing its components. Each cartridge has at least two compartments. The cartridge shown herein has a first compartment 310 and a second compartment 320. A cartridge may have any higher number of compartments. Each compartment has a refill opening 302, 303 at its top, and a retrieval opening 304, 305 at its bottom. The openings are preferably adapted to the outer contour of the balancing weights. This can prevent insertion of wrong balancing weights into a compartment. Preferably, all compartments of a cartridge have the same shape and are designed for the same type of balancing weights. For holding and for guiding the balancing weights within a compartment, guides 306 are provided. The balancing weights 400 are stacked within the guides. The form and the distance of the guides are adapted to a specific type of balancing weights. For the operation of the cartridge, only the retrieval openings 304, 305 are required. The cartridge may be a one-way cartridge, which is prefilled. In such a case, the refill openings 302, 303 are not required.

Figure 3:
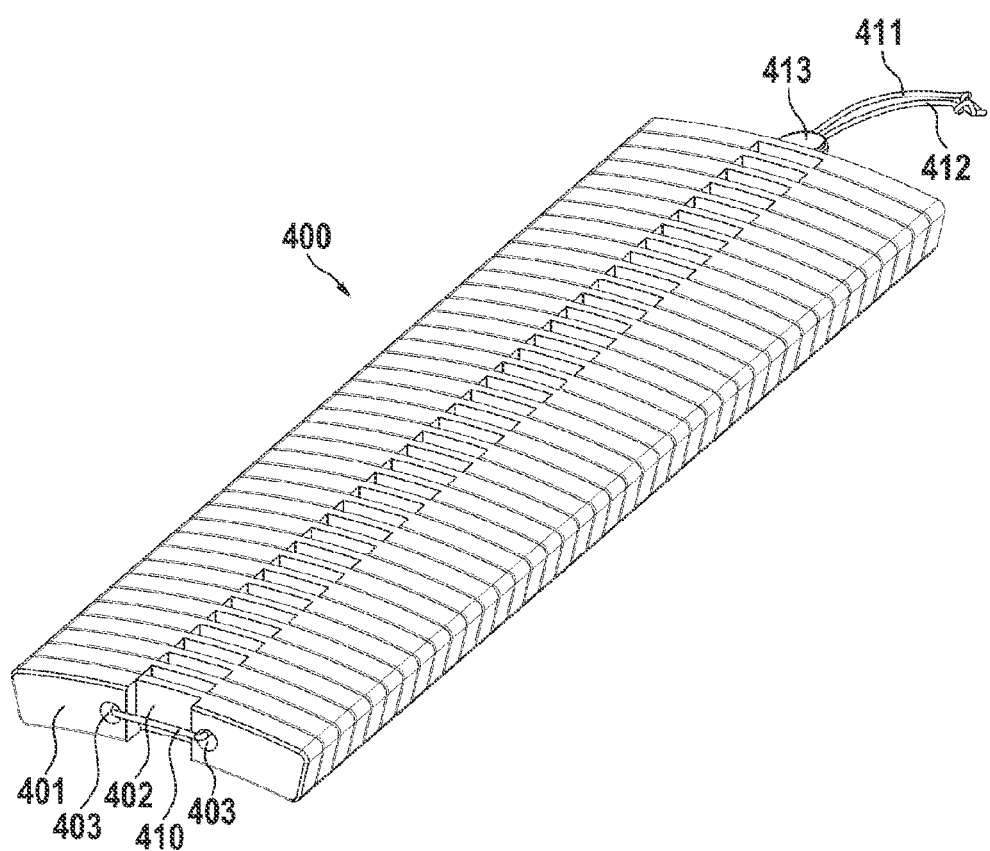
FIG. 3 shows an embodiment of balancing weights.

In FIG. 3, a preferred embodiment of balancing weights is shown. This embodiment can easily be loaded into a compartment of a cartridge. In this embodiment, each individual balancing weight 401 has at least two holes 403, through which a connecting cord 410 is threaded. The term "cord" is to be understood in a broad sense, comprising any one of a braid, wire, or band of suitable material such as metal, natural or synthetic fibers. On the other side of the stack, there are two open ends 411, 412 of the connecting cord, which may be secured by a knot. Preferably, the ends are secured by a seal 413. It is preferred, if the seal and/or the connecting cord has a specific colour, identifying the type or weight of the balancing weights. A stack of balancing weights 400 is handled and secured by the connecting cord. It may be inserted into the compartment of the cartridge. Due to the adapted size of the refill opening, the balancing weights slide smoothly into the compartment. When the balancing weights are seated within the compartment, the connecting cord may be removed. This may be done by removing the seal 413 and/or cutting through the connecting cord at a location between the seal and the stack of balancing weights. After cutting one side of the connecting cord, the remaining connecting cord may be pulled out of the holes by simply pulling at the open ends or the seal. With the use of this embodiment, refilling of a cartridge is made a very simple process and may be performed within a few seconds.

It will be appreciated to those skilled in the art having the benefit of this disclosure that this invention is believed to provide an apparatus and a method for automatic dispensing of vehicle balancing weights. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 101-112 dispenser modules
120 actuator controller
201 cartridge actuator
202 cartridge
203 slider
204 sensor
205 cartridge in second position
206 slider in loading position
207 slider feed opening
208 balancing weight compartment
209 slider actuator
210 picking tray
220 axis of movement of cartridge
221 axis of movement of slider
300 cartridge
301 frame
302, 303 refill openings
304, 305 retrieval openings
306 guides
310 first compartment
320 second compartment
400 balancing weights
401 individual balancing weight
402 recess
403 holes
410 connecting cord
411, 412 open ends of the cord
413 seal

The invention claimed is:

1. A dispenser of balancing weights for vehicles, comprising at least one dispenser module and further comprising, in said dispenser module, at least:
   a cartridge configured to be reciprocatingly moved by a cartridge actuator along a first axis and configured to store balancing weights, the cartridge having a frame dimensioned to circumscribe at least two compartments for storing balancing weights,
      wherein each compartment has respectively-correspondingly retrieval opening formed through a lower portion of the frame,
   the cartridge actuator configured to linearly and reciprocatingly move the cartridge along the first axis to position a retrieval opening of a compartment from said at least two compartments above a slider feed opening in the dispenser module, said slider feed opening dimensioned to receive a balancing weight from within the frame through the retrieval opening,
   a picking tray in which the balancing weight is delivered,
   a slider having a balancing weight compartment and configured to be moveable by a slider actuator along a second axis parallel to the first axis to position the balancing weight compartment into at least two positions:
   a first position is defined under the slider feed opening in the dispenser module to permit a balancing weight from a compartment above the slider feed opening to drop into the balancing weight compartment and
   a second position is defined in the picking tray.

2. A dispenser according to claim 1, wherein the cartridge actuator is one of an electric actuator, a pneumatic actuator, and a hydraulic actuator.

3. A dispenser according to claim 1, wherein the slider actuator is one of an electric actuator, a pneumatic actuator, and a hydraulic actuator.

4. A dispenser according to claim 1, wherein an actuator controller is provided to control the movement of at least one of the cartridge actuator and slider actuator.

5. A dispenser according to claim 1, wherein the balancing weight compartment is dimensioned to fit to an outline of the balancing weight.

6. A dispenser according to claim 1, wherein each compartment for storing balancing weights has a refill opening in an upper portion of said frame, and wherein at least one of (i) said refill opening and (ii) said retrieval opening is dimensioned to fit to an outline of the balancing weight to allow smooth sliding of the balancing weight through said refill opening and said retrieval opening.

7. A dispenser according to claim 1, wherein each compartment for storing balancing weights includes a plurality of guides.

8. A dispenser according to claim 1, further comprising a plurality of dispenser modules configured to accommodate balancing weights of respectively-corresponding different sizes.

9. A method for delivering balancing weights to a picking tray of a dispenser of balancing weights for vehicles, the dispenser having at least one dispenser module, the methods comprising the steps of:
   disposing said balancing weights within a cartridge of the dispenser through a refill opening in a frame of the cartridge such that a frame of the cartridge circumscribes said balancing weights stored therein;
   reciprocatingly moving the cartridge along a first axis to position a retrieval opening of a first compartment of the cartridge above a slider feed opening of the at least one dispenser module, said retrieval opening formed in said frame;
   dropping a balancing weight from said balancing weights into a balancing weight compartment of a slider, of the dispenser, through a slider feed opening;
   pushing the slider together with said balancing weight to the picking tray.

* * * * *